United States Patent Office.

ERNEST EDWARDS, OF FIRS WILLESDEN, GREAT BRITAIN.

Letters Patent No. 90,514, dated May 25, 1869.

IMPROVEMENT IN PHOTOGRAPHIC PRINTING.

The Schedule referred to in these Letters Patent and making part of the same.

*To all whom it may concern:*

Be it known that I, ERNEST EDWARDS, of the Firs Willesden, in the county of Middlesex, and Kingdom of Great Britain, have invented "An Improved Method of Preparing Surfaces for Receiving, during the Process of Washing, and Developing and Permanently Retaining Gelatine Photographs."

The surface which is to be prepared may be made of paper, of any thickness, surface, or color, or of linen, canvas, glass, porcelain, wood, metal, leather, or of any substance which does not injuriously affect the materials employed.

The surface is prepared with gelatine, gum, albumen, or fibrine, to which has been added sufficient of one substance, or of a combination of substances which have the property of producing insolubility of gelatine, gum, albumen, or fibrine, as, for instance, the preparations known as ammonia-alum, iron-alum, and other varieties of alum, acetate of alumina, the chromates or bichromates, bichloride of mercury, and tannin.

The preparation of the surface is effected by floating it on, coating it with, or immersing it in a preparation of gelatine, or organic substance, such as I have above described, and the surface thus prepared, is then allowed to dry in the light, whereby it becomes ready for use, or a suitable quantity of the preparation can be mixed with the pulp of the paper or material, in the course of its manufacture.

The following is a good formula for the preparation: ammonia-alum, one part; gelatine, four parts; water, one hundred parts; but this may be varied.

I always use insoluble gelatine, or organic substance, as above described, as the support, or cement for the picture during development.

The surface thus prepared, and that of the gelatinous image obtained by light, having been placed together under water, so as to exclude air, they are withdrawn, and as much water as possible is got rid of by means of a "squeezer" of India rubber. The resulting mass is then placed in water, of a sufficiently high temperature to wash away the parts of the sensitized gelatine and pigment, not acted on by light, together with the paper, or other substance which originally supported them, and the picture is found to be very firmly attached to the surface, its adhesion thereto not being affected by the use of the warm water employed in washing away the unaltered portions of gelatine and pigment.

What I claim, is—

Gelatine, gum, albumen, fibrine, and such like organic substances, prepared and rendered insoluble substantially as herein described, when employed for the purpose of receiving, during the process of washing, and of subsequently permanently retaining gelatine photographs.

ERNEST EDWARDS.

Witnesses:
  H. I. HADDAN,
    67 *Strand, London.*
  ROBT. BOYD,
    117 *Mount Street,*
      *Grosvenor Square, London.*